United States Patent
Weiler

(10) Patent No.: US 6,727,323 B2
(45) Date of Patent: Apr. 27, 2004

(54) PROCESS FOR REDUCING ODOR EMISSION IN AQUEOUS POLYMER DISPERSIONS AND IN POLYMER POWDERS

(75) Inventor: Peter Weiler, Geretsried (DE)

(73) Assignee: Wacker Polymer Systmes GmbH & Co. KG, Burghausen (DE)

( * ) Notice: Subject to any disclaimer, the term of this patent is extended or adjusted under 35 U.S.C. 154(b) by 0 days.

(21) Appl. No.: 10/463,048

(22) Filed: Jun. 17, 2003

(65) Prior Publication Data

US 2003/0236336 A1 Dec. 25, 2003

(30) Foreign Application Priority Data

Jun. 20, 2002 (DE) .......................... 102 27 589

(51) Int. Cl.$^7$ ................................. C08F 8/34
(52) U.S. Cl. ................ 525/344; 524/459; 524/547; 524/543; 524/548; 524/555; 524/556; 524/560; 524/562; 524/571; 525/346; 525/347; 525/354; 525/353; 525/362; 525/371
(58) Field of Search ............... 524/343, 459, 524/548, 547, 555, 556, 560, 562, 571; 525/344, 346, 347, 354, 371, 353, 362

(56) References Cited

U.S. PATENT DOCUMENTS

| | | | |
|---|---|---|---|
| 3,692,726 A | * 9/1972 | Oehmichen | ................. 524/189 |
| 4,127,382 A | 11/1978 | Perry | |
| 4,529,753 A | 7/1985 | Taylor | |
| 4,659,793 A | 4/1987 | Yang | |
| 4,906,462 A | 3/1990 | Miki et al. | |
| 4,909,986 A | * 3/1990 | Kobayashi et al. | ............. 422/4 |
| 4,959,207 A | * 9/1990 | Ueda et al. | ................ 424/76.1 |
| 5,756,574 A | * 5/1998 | Baumstark et al. | ......... 524/460 |
| 5,994,457 A | * 11/1999 | Stanger et al. | ............. 524/800 |
| 6,258,890 B1 | * 7/2001 | Schmidt-Thuemmes et al. | ......... 524/555 |
| 6,365,709 B1 | * 4/2002 | Heibel et al. | ............... 528/480 |
| 6,417,297 B1 | * 7/2002 | Mayer et al. | ................. 526/78 |
| 6,426,377 B1 | * 7/2002 | Gerst et al. | ................. 524/166 |
| 6,433,132 B1 | * 8/2002 | Wood et al. | ................ 528/480 |

FOREIGN PATENT DOCUMENTS

| | | |
|---|---|---|
| DE | 44 19 518 A1 | 7/1995 |
| DE | 197 28 997 A1 | 7/1997 |
| EP | 0 327 006 | 8/1989 |
| EP | 1 065 225 A1 | 6/2000 |
| GB | 2 340 505 | 2/2000 |
| JP | 62 204755 | 9/1987 |
| WO | WO 03/002618 A1 | 6/2002 |

OTHER PUBLICATIONS

Derwent Abstract corresp. to EP 32 7006 [AN 1989–229056].
Derwent Abstract corresp. to DE 4419518 [AN 1996–021300].
Derwent Abstract corresp. to JP 62204755 [AN 1987–294258].
Derwent Abstract corresponding to DE 197 28 997 [AN 1998–121682].

* cited by examiner

Primary Examiner—Judy M. Reddick
(74) Attorney, Agent, or Firm—Brooks Kushman P.C.

(57) ABSTRACT

A process for reducing odor emission in aqueous polymer dispersions and in polymer powders comprises admixing an aqueous dispersion of a polymer obtained by free-radical polymerization of one or more ethylenically unsaturated monomers, after conclusion of the polymerization, with an odor-reducing composition containing a) one or more water-soluble compounds selected from metal salts of copper(II), silver, aluminum, zinc and iron(III), potassium permanganate, imidazoline, and imidazoline derivatives, optionally in combination with b) one or more water-soluble reducing agents selected from ascorbic acid, isoascorbic acid, iron(II) salts, zinc formaldehydesulfoxylate and alkali metal formaldehydesulfoxylate, and optionally drying the thus treated aqueous polymer dispersion to form a polymer powder.

10 Claims, No Drawings

PROCESS FOR REDUCING ODOR EMISSION IN AQUEOUS POLYMER DISPERSIONS AND IN POLYMER POWDERS

BACKGROUND OF THE INVENTION

1. Field of the Invention

This invention relates to a process for reducing odor emission in aqueous polymer dispersions and in polymer powders.

2. Background Art

Polymer dispersions and polymer powders are used as binders in the building, coating and textile sectors. One problem of such dispersions and polymer powders is that they generally still contain volatile odor-intensive constituents such as mercaptans, which are used as chain transfer agents in polymerization; ammonia, which is used for neutralization; residual monomers; nonpolymerizable impurities of the monomers; volatile reaction products of the monomers that are formed under reaction conditions; and volatile degradation products of the polymers. The resulting odor is perceived as unpleasant not only by manufacturers but also by users/consumers, which is why there is a need for deodorized aqueous polymer dispersions and polymer powders.

In addition to the intrinsic odor of polymer dispersions, there are often odor sources which arise during processing. One example is in the production of fibers. Fibers are subjected to a high mechanical load in the course of processing. In order that they may be able to withstand this high mechanical stress, they are treated with pretreatment agents such as sizes, textile auxiliaries for dyeing and printing, and fiber finishes. Typical textile auxiliaries include dispersants (e.g. naphthalenesulfonates, fatty alcohol ethoxylates, polyacrylates), dyeing wetters, dyeing accelerants, dyes (e.g. indigo, sulfur dyes). Finishes include optical brighteners, agents for improving the wrinkling and creasing characteristics, antistats, hydrophobicizers, and flame retardants. All these additives are subjected to a high thermal load together with the polymers in the course of pressing operations. Decomposition reactions which take place lead to a multiplicity of chemical compounds which are responsible for an unpleasant odor.

It is known to deodorize polymer dispersions by physical or chemical aftertreatment. Physical processes, for example, include distillative processes, especially steam distillation, and also stripping with inert gases, as disclosed in EP-A 327006. The disadvantage of this process is that many dispersions are insufficiently stable for this kind of deodorization, so that coagulum formation occurs, which necessitates costly and inconvenient filtration before further use. The process has a further disadvantage, in that although it is able to reduce the fraction of volatile materials in the aqueous polymer dispersion, it does not resolve the issue of disposing of these materials.

It is also known to free polymer dispersions of odor-intensive monomers by chemical aftertreatment. For instance, DE-A 4419518 describes a free-radical postpolymerization using redox initiator systems to lower the level of residual monomers by chemical means. U.S. Pat. No. 4,529,753 describes a process whereby the level of residual monomers in aqueous polymer dispersions can be reduced by the action of particular free-radical redox initiator systems in a free-radical postpolymerization subsequent to the end of the main polymerization reaction. Such redox initiator systems comprise at least one oxidizing agent, at least one reducing agent and also one or more transition metal ions occurring in various valency states.

However, the above-recommended processes are disadvantageous in that, although they are in some instances able to lower the residual monomer content when used in odor-intensive polymer dispersions, they are not effectively able to control the unpleasant odor due to odor-intensive by-products, nonpolymerizable impurities of the monomers, volatile reaction products of the monomers, or volatile degradation products of the polymers. Nor are these measures able to effectively prevent the odor emission which is due to auxiliaries which are-used in the course of the processing of the polymer dispersions or polymer powders.

U.S. Pat. No. 4,906,462 discloses an odor-inhibiting composition which contains a phosphoric acid component, a copper compound and optionally a reducing agent. JP-A 62-204755 utilizes a combination of copper sulfate and ascorbic acid for deodorization in air-conditioning systems. GB-A 2340505 describes the use of imidazole compounds for odor minimization in natural gas and crude oil.

SUMMARY OF THE INVENTION

It is an object of the present invention to provide a process for effectively reducing the odor emission of polymer dispersions and polymer powders, in particular during their processing. These and other objects are achieved by admixing an aqueous polymer dispersion, post-polymerization, with a selected group of water soluble deodorizing compounds.

DETAILED DESCRIPTION OF THE PREFERRED EMBODIMENT(S)

The subject invention process for reducing odor emission in aqueous polymer dispersions and in polymer powders, comprises admixing an aqueous dispersion of a polymer obtainable by free-radical polymerization of one or more ethylenically unsaturated monomers, after conclusion of the polymerization, with a) one or more water-soluble compounds selected from the group consisting of metal salts of copper(II), silver, aluminum, zinc, or iron(III), potassium permanganate, and imidazoline and imidazoline derivatives, optionally in combination with b) one or more water-soluble reducing agents selected from the group consisting of ascorbic acid, isoascorbic acid, iron(II) salts, zinc formaldehydesulfoxylate and alkali metal formaldehydesulfoxylate, and optionally drying the thus treated aqueous polymer dispersion to form a polymer powder. "Water-soluble" denotes a solubility of $\geq 1$ g/l in water under standard conditions (standard climate 23/50, DIN 50014).

Preferably, the component a) and the optional component b) are added in an amount of 0.01% to 15.0% by weight, more preferably 0.01% to 10.0% by weight and most preferably 0.01% to 1.0% by weight, each based on the weight of the polymer, to the polymer dispersion. Preferably, the two components a) and b) are added to the polymer dispersion in the form of their aqueous solutions.

Preference as to component a) is given to copper(II) sulfate, silver sulfate, aluminum sulfate, zinc sulfate, iron (III) chloride, potassium permanganate, and imidazoline. Preference as component b) is given to ascorbic acid. Particular preference as to component a) is given to copper (II) sulfate, zinc sulfate, a mixture of zinc sulfate and aluminum sulfate, and also each combination thereof with ascorbic acid as component b).

Useful ethylenically unsaturated monomers include one or more monomers selected from the group consisting of vinyl esters of branched or unbranched alkylcarboxylic acids having 1 to 18 carbon atoms, acrylic esters or methacrylic esters of branched or unbranched alcohols having 1 to 18 carbon atoms, or diols having 2 to 18 carbon atoms, ethylenically unsaturated mono- and dicarboxylic acids and also their amides and N-methylolamides and nitriles, ethylenically unsaturated sulfonic acids, ethylenically unsaturated heterocyclic compounds, dienes, olefins, styrenics and vinyl halides.

Useful vinyl esters include those of carboxylic acids having 1 to 12 carbon atoms. Preference is given to vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 9 to 13 carbon atoms, for example VeoVa9® or VeoVa10® (trade names of Shell). Particular preference is given to vinyl acetate.

Suitable monomers from the acrylic esters or methacrylic esters group are esters of branched or unbranched alcohols having 1 to 15 carbon atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, t-butyl acrylate, t-butyl methacrylate, 2-ethylhexyl acrylate. Particular preference is given to methyl acrylate, methyl methacrylate, n-butyl acrylate, t-butyl acrylate and 2-ethylhexyl acrylate.

Examples of suitable ethylenically unsaturated mono- and dicarboxylic acids and also their amides or N-methylolamides and nitriles are acrylic acid, methacrylic acid, fumaric acid, maleic acid, acrylamide, N-methylolacrylamide, N-methylolmethacrylamide and acrylonitrile. Examples of ethylenically unsaturated sulfonic acids are vinylsulfonic acid and 2-acrylamido-2-methylpropanesulfonic acid. Suitable ethylenically unsaturated heterocyclic compounds are vinylpyrrolidone and vinylpyridine.

Preferred styrenics are styrene, methylstyrene and vinyltoluene. The preferred vinyl halide is vinyl chloride. The preferred olefins are ethylene, propylene and the preferred dienes are 1,3-butadiene and isoprene. These monomers in all classes are exemplary only, and not limiting.

Optionally, 0.1% to 50% by weight, based on the total weight of the monomer mixture, of auxiliary monomers can be copolymerized. Preference is given to using 0.5 to 15% by weight of auxiliary monomers. Examples of auxiliary monomers are ethylenically unsaturated mono- and dicarboxylic acids, preferably acrylic acid, methacrylic acid, fumaric acid and maleic acid; ethylenically unsaturated carboxylic amides and nitriles, preferably acrylamide and acrylonitrile; mono- and diesters of fumaric acid and maleic acid such as their diethyl and diisopropyl esters; maleic anhydride; and ethylenically unsaturated sulfonic acids and salts thereof, preferably vinylsulfonic acid, 2-acrylamido-2-methylpropanesulfonic acid. Further examples are pre-crosslinking comonomers such as multiply ethylenically unsaturated comonomers, for example divinyl adipate, diallyl maleate, diallyl phthalate, allyl methacrylate or triallyl cyanurate, or postcrosslinking comonomers, for example acrylamidoglycolic acid (AGA), methylacrylamidoglycolic methyl ester (MAGME), N-methylolacrylamide (NMA), N-methylolmethacrylamide, allyl N-methylolcarbamate, alkyl ethers or esters such as the isobutoxy ether or ester of N-methylolacrylamide, of N-methylolmethacrylamide or of allyl N-methylolcarbamate. Also suitable are epoxy-functional comonomers such as glycidyl methacrylate and glycidyl acrylate. Further examples are silicon-functional comonomers such as acryloyloxypropyltri(alkoxy)- and methacryloyloxypropyltri(alkoxy)-silanes, vinyltrialkoxysilanes and vinylmethyldialkoxysilanes, where the alkoxy groups may be for example ethoxy and ethoxypropylene glycol ether radicals. Also suitable are monomers having hydroxyl or CO groups, for example methacrylic and acrylic hydroxyalkyl esters such as hydroxyethyl acrylate, hydroxypropyl acrylate, hydroxybutyl acrylate, hydroxyethyl methacrylate, hydroxypropyl methacrylate or hydroxybutyl methacrylate, as well as compounds such as diacetoneacrylamide or acetylacetoxyethyl acrylate or methacrylate.

Particular preference is given to monomers or mixtures which contain one or more monomers selected from the group consisting of vinyl acetate, vinyl esters of α-branched monocarboxylic acids having 9 to 13 carbon atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate and styrene. Most preference is given to mixtures of vinyl acetate with ethylene; of vinyl acetate, ethylene and a vinyl ester of α-branched monocarboxylic acids having 9 to 13 carbon atoms; of n-butyl acrylate with 2-ethylhexyl acrylate and/or methyl methacrylate; of styrene with one or more monomers selected from the group consisting of methyl acrylate, ethyl acrylate, propyl acrylate, n-butyl acrylate and 2-ethylhexyl acrylate; of vinyl acetate with one or more monomers selected from the group consisting of methyl acrylate, ethyl acrylate, propyl acrylate, n-butyl acrylate and 2-ethylhexyl acrylate and optionally ethylene. The foregoing mixtures may optionally contain one or more of the abovementioned auxiliary monomers.

The choice of monomer or the choice of the weight fractions of comonomers is made so as to generally bring about a glass transition temperature Tg in the range from −50° C. to +120° C. and preferably in the range from −30° C. to +95° C. The glass transition temperature Tg of polymers can be determined in known manner by Differential Scanning Calorimetry (DSC). The Tg can also be approximately predicted by means of the Fox equation. According to T. G. Fox, BULL. AM. PHYSICS SOC. 1, 3, page 123 (1956): $1/Tg = x_1/Tg_1 + x_2/Tg_2 + \ldots + x_n/Tg_n$, where $x_n$ is the mass fraction (% by weight/100) of monomer n and $Tg_n$ is the glass transition temperature in kelvin of the homopolymer of monomer n. Tg values of homopolymers are recited in Polymer Handbook 2nd Edition, J. Wiley & Sons, New York (1975).

The free-radically initiated polymerization of the ethylenically unsaturated monomers can in principle be effected using any polymerization process known for this purpose, such as bulk polymerization, solution polymerization, precipitation polymerization, suspension polymerization and emulsion polymerization. Preference is given to solution polymerization, suspension polymerization and emulsion polymerization The polymerization temperature is generally in the range from 40° C. to 100° C. and preferably in the range from 60° C. to 90° C. A copolymerization of gaseous comonomers such as ethylene, 1,3-butadiene or vinyl chloride can also be carried out under superatmospheric pressure, in general between 5 bar and 100 bar. The polymerization may be initiated using the customary water-soluble or monomer-soluble initiators or redox initiator combinations. Examples of water-soluble initiators are the sodium, potassium and ammonium salts of peroxydisulfuric acid, hydrogen peroxide, t-butyl peroxide, potassium peroxydiphosphate, t-butyl peroxypivalate, cumene hydroperoxide, isopropylbenzene monohydroperoxide, and azobisisobutyronitrile. Examples of monomer-soluble initiators are dicetyl peroxydicarbonate, dicyclohexyl peroxydicarbonate, dibenzoyl peroxide, tert-butyl peroxyneodecanoate, tert-butyl peroxy-2-ethylhexanoate and tert-butyl peroxypivalate. The initiators mentioned are generally used in an amount of 0.01% to 10.0% by weight and preferably in an amount of 0.1% to 0.5% by weight, each percentage being based on the total weight of the monomers. Redox initiators used are combinations of the initiators mentioned in combination with reducing agents. Suitable reducing agents are the sulfites and bisulfites of the alkali metals and of ammonium, for example sodium sulfite, the derivatives of sulfoxylic acid such as zinc or alkali metal formaldehydesulfoxylates, for example sodium hydroxymethanesulfinate, and ascorbic acid. The amount of reducing agent is generally in the range from 0.01% to 10.0% by weight and preferably in the range from 0.1% to 0.5% by weight, each percentage being based on the total weight of the monomers.

The preferred processes of suspension polymerization and emulsion polymerization comprise polymerization in the presence of surface-active substances such as protective colloids and/or emulsifiers. Useful protective colloids include for example partially hydrolyzed polyvinyl alcohols, polyvinylpyrrolidones, polyvinyl acetals, starches, celluloses and their carboxymethyl, methyl, hydroxyethyl and hydroxypropyl derivatives. Useful emulsifiers include not only anionic and cationic emulsifiers but also nonionic emulsifiers, for example anionic surfactants such as alkyl sulfates having a chain length of 8 to 18 carbon atoms, alkyl or alkylaryl ether sulfates having 8 to 18 carbon atoms in the hydrophobic moiety and up to 60 ethylene oxide or propylene oxide units, alkyl or alkylaryl sulfonates having 8 to 18 carbon atoms, esters and monoesters of sulfosuccinic acid with monohydric alcohols or alkylphenols, or nonionic surfactants such as alkyl polyglycol ethers or alkylaryl polyglycol ethers having up to 60 ethylene oxide or propylene oxide units.

The monomers may be introduced all together as initial charge, may be metered in all together or may be initially charged in fractions with the remainder being metered in after the polymerization has been initiated. The metered additions may be carried out separately (in space and time), or the components to be metered may all or in part be metered in a preemulsified state.

After the polymerization has ended, a postpolymerization may be carried out by known methods for residual monomer removal, for example by postpolymerization initiated using redox catalyst. Residual monomers which are volatile may also be removed by distillation, preferably under reduced pressure, with or without inert entraining gases such as air, nitrogen or water vapor being passed through or over. The aqueous polymer dispersions have a solids content of 30% to 75% by weight and preferably of 50% to 60% by weight.

Polymer powders are prepared by drying the aqueous dispersions, with or without addition of protective colloids as an atomizing aid, for example by fluidized bed drying, freeze drying or spray drying. The dispersions are preferably spray dried. Spray drying is effected in customary spray dryers, the dispersions being atomized using nozzles for one, two or more materials or using a rotating disk. The outlet temperature is generally chosen in the range from 45° C. to 120° C., preferably in the range from 60° C. to 90° C., depending on equipment, resin Tg and desired degree of drying.

The drying to polymer powders which are redispersible in water is generally carried out using an atomizing aid in a total amount of 3% to 30% by weight, based on the polymeric constituents of the dispersion. In other words, the total amount of protective colloid prior to the drying operation should be at least 3% to 30% by weight, based on the polymer fraction; preference is given to using 5% to 20% by weight, based on the polymer fraction.

Useful atomizing aids include partially hydrolyzed polyvinyl alcohols; polyvinylpyrrolidones; polysaccharides in water-soluble form such as starches (e.g. amylose and amylopectin), celluloses and their carboxymethyl, methyl, hydroxyethyl and hydroxypropyl derivatives; proteins such as casein or caseinate, soyprotein, gelatin; ligninsulfonates; synthetic polymers such as poly(meth)acrylic acid, copolymers of (meth)acrylates with carboxyl-functional comonomer units, poly(meth)acrylamide, polyvinylsulfonic acids and their water-soluble copolymers; melamineformaldehydesulfonates, naphthaleneformaldehydesulfonates, styrene-maleic acid and vinyl ether-maleic acid copolymers. Preferably, no protective colloids other than polyvinyl alcohols are used as an atomizing aid.

It may also be preferable for atomizing to be carried out in the presence of up to 1.5% by weight of antifoam, based on the base polymer. To enhance storability by improving blocking resistance, especially in the case of powders having a low glass transition temperature, the powder obtained may be treated with an antiblocking or anticaking agent, preferably up to 30% by weight, based on the total weight of polymeric constituents. Examples of antiblocking agents are calcium carbonate, magnesium carbonate, talc, gypsum, silica, kaolins, and silicates, preferably having particle sizes in the range from 10 nm to 10 $\mu$m.

The viscosity of the atomizing feed is adjusted via the solids content such that a value of preferably <500 mPas (Brookfield viscosity at 20 revolutions and 23° C.) and more preferably <250 mPas is obtained. The solids content of the dispersion to be atomized is preferably >35% and more preferably >40%.

To improve performance properties, further additives may be added in the course of atomizing. Further constituents (in preferred embodiment) of redispersible powder compositions are for example pigments, fillers, foam stabilizers, and hydrophobicizers.

Thus treated polymer dispersions and polymer powders can be used in their typical applications. For example in construction-chemical products, optionally in conjunction with hydraulically setting binders such as cements (Portland cement, aluminate cement, trass cement, blast furnace cement, magnesia cement, phosphate cement), gypsum, and water glass, for producing building adhesives, especially tile adhesives and exterior insulation system adhesives, plasters and renders, knifing fillers, flooring screeds, leveling compounds, sealing slurries, jointing mortars and paints. Further uses include binders for coatings and adhesives or for coating and bonding agents for textiles, fibers, wood and paper.

EXAMPLE 1 (COMPARATIVE)

Preparation of a polyvinyl alcohol stabilized emulsion polymer.

A stirred autoclave having a capacity of about 16 l was charged with 3.4 l of deionized water and 3.85 kg of a 20% by weight aqueous solution of an 88 mol % hydrolyzed polyvinyl acetate having a 4% solution Hoppler viscosity of 4 mPas (DIN 53015, Hoppler method at 20° C.). The pH was adjusted to 4.0–4.2 using 10% by weight formic acid. This was followed by evacuation, purging with nitrogen, reevacuation and introduction of a mixture of 4.54 kg of styrene, 2.40 kg of 1,3-butadiene and 64.8 g of tert-dodecyl mercaptan. After heating to 80° C., the polymerization was started by simultaneous introduction of two catalyst solutions, of which the first consisted of 197 g of deionized water and 66 g of 40% aqueous tert-butyl hydroperoxide solution, and the other of 508 g of deionized water and 57 g of sodium formaldehydesulfoxylate. The peroxide solution was added at a rate of 44 ml/h and the sodium formaldehydesulfoxylate solution at 94 ml/h. 3.5 hours after the start of the polymerization the conversion of the initially charged monomers was 90%. After a further 2 hours, the initiator feeds were stopped, and the reactor contents were cooled down to 60° C. and freed of residual butadiene under reduced pressure for one hour. The polymerization conversion was >99.5% by weight.

The aqueous polymer dispersion obtained had a solids content of 52.6% by weight. The coagulum fraction formed in the course of the polymerization was below 0.5% by weight, based on the amount of monomers to be polymerized. The glass transition temperature of the film formed from the aqueous polymer dispersion was 0° C.

400 parts by weight of the dispersion were admixed with 200 parts by weight of a 10.3% by weight solution of a polyvinyl alcohol (partially hydrolyzed polyvinyl acetate, degree of hydrolysis 88 mol %, viscosity of 4% solution 13 mPas), 0.84 part by weight of defoamer and 135 parts by weight of water and thoroughly mixed therewith. The dispersion was sprayed through a two-material nozzle. The atomizing component used was compressed air at 4 bar, the drops formed were dried with hot air at 125° C. in a cocurrent stream. The dry powder obtained was admixed with 10% of commercially available antiblocking agent, a mixture of calcium magnesium carbonate and magnesium hydrosilicate.

EXAMPLE 2

The dispersion was prepared similarly to comparative example 1. After the polymerization had ended, 0.5 part by weight of 10% by weight copper sulfate solution was added and the dispersion was intensively stirred. The redispersible powder was produced similarly to comparative example 1.

EXAMPLE 3

The dispersion was prepared similarly to comparative example 1. After the polymerization had ended, 0.5 part by weight of 10% by weight copper sulfate solution was added and the dispersion was intensively stirred. After a further 10 minutes, 0.55 part by weight of 10% by weight ascorbic acid solution was gradually added. The redispersible powder was produced similarly to comparative example 1.

EXAMPLE 4

The dispersion was prepared similarly to comparative example 1. After the polymerization had ended, 0.5 part by weight of 10% by weight zinc sulfate solution was added and the dispersion was intensively stirred. The redispersible powder was produced similarly to comparative example 1.

EXAMPLE 5

The dispersion was prepared similarly to comparative example 1. After the polymerization had ended, 0.1 part by weight of imidazoline (Unimid Z940, Arizona Chemical B.V.) was added and the dispersion was intensively stirred. The redispersible powder was produced similarly to comparative example 1.

EXAMPLE 6 (COMPARATIVE)

Preparation of an emulsifier-stabilized emulsion polymer having epoxy functionality.

A 2 liter reactor was charged with 331.4 g of deionized water, 29.0 g of 20% sodium dihexyl sulfosuccinate solution, 78.9 g of styrene and 29.0 g of butyl acrylate, and the initial charge was heated to 80° C. with stirring. The initiator addition was started at 80° C.

Initiator 1: 40.5 g of deionized water and 7.2 g of ascorbic acid.

Initiator 2: 26.8 g of deionized water and 9.0 g of 40% tert-butyl hydroperoxide solution.

The monomer addition was started after 40 minutes. P

Monomers: 229.0 g of deionized water, 12.4 g n-dodecyl mercaptan 484.4 g of styrene, 58.0 g of butyl acrylate, 13.8 g of 30% aqueous acrylamide solution, 16.6 g of 50% aqueous 2-acrylamido-2-methylpropanesulfonic acid, 165.7 g. of glycidyl methacrylate, 6.6 g of fatty alcohol polyglycol ether having 12 to 14 carbon units and 50 EO units and 48.3 g of 31% aqueous solution of a disodium lauryl ether sulfosuccinate having 6 EO units.

The pH was adjusted to 5–5.5 during the reaction. On completion of the four-hour monomer addition, initiator additions 1 and 2 were each continued for an hour before the pH was adjusted to 7.5 using 12.5% ammonia solution.

The solids content was 52.6%, the viscosity 47 mPas and the K value 24. Spray drying gave a free-flowing powder having a particle size of about 30 $\mu$m (volume average).

EXAMPLE 7

The dispersion was prepared similarly to comparative example 6. After the polymerization had ended, 0.5 part by weight of 10% by weight copper sulfate solution was added and the dispersion was intensively stirred. The redispersible powder was produced similarly to Comparative Example 6.

EXAMPLE 8

The dispersion was prepared similarly to comparative example 6. After the polymerization had ended, 0.5 part by weight of 10% by weight copper sulfate solution was added and the dispersion was intensively stirred. After a further 10 minutes, 0.55 part by weight of 10% by weight ascorbic acid solution was gradually added. The redispersible powder was produced similarly to Comparative Example 6.

EXAMPLE 9

The dispersion was prepared similarly to Comparative Example 6. After the polymerization had ended, 0.5 part by weight of 10% by weight zinc sulfate solution was added and the dispersion was intensively stirred. The redispersible powder was produced similarly to Comparative Example 6.

EXAMPLE 10

The dispersion was prepared similarly to Comparative Example 6. After the polymerization had ended, 0.1 part by weight of imidazoline (Unimid Z940, Arizona Chemical B.V.) was added and the dispersion was intensively stirred. The redispersible powder was produced similarly to comparative example 6.

EXAMPLE 11 (COMPARATIVE)

Preparation of an emulsifier-stabilized emulsion polymer having acid functionality.

A 2 liter reactor was charged with 330.2 g of deionized water, 33.0 g of 20% sodium dihexyl sulfosuccinate solution, 78.6 g of styrene and 28.9 g of butyl acrylate, and the initial charge was heated to 80° C. with stirring. The initiator additions were begun at 80° C.

Initiator 1: 33.6 g of deionized water and 5.9 g of ascorbic acid.

Initiator 2: 23.3 g of deionized water and 7.4 g of 40% tert-butyl hydroperoxide solution The monomer addition was started after 40 minutes.

Monomers: 222.6 g of deionized water, 12.4 g n-dodecyl mercaptan 400.2 g of styrene, 206.4 g of butyl acrylate, 13.8 g of 30% aqueous acrylamide solution, 16.5 g of 50% aqueous 2-acrylamido-2-methylpropanesulfonic acid, 12.4 g of acrylic acid, 86.7 g of methacrylic acid, 8.3 g of fatty alcohol polyglycol ether having 12 to 14 carbon units and 50 EO units and 55.0 g of 31% aqueous solution of a disodium lauryl ether sulfosuccinate having 6 EO units.

The pH was adjusted to 4 during the reaction. On completion of the four-hour monomer add, initiator additions 1 and 2 were each continued for an hour before the pH was adjusted to 7.5 using 12.5% ammonia solution.

The solids content was 52.9%, the viscosity 133 mPas and the K value 25. Spray drying gave a free-flowing powder having a particle size of about 30 μm (volume average).

EXAMPLE 12

The dispersion was prepared similarly to comparative example 11. After the polymerization had ended, 0.5 part by weight of 10% by weight copper sulfate solution was added and the dispersion was intensively stirred. The redispersible powder was produced similarly to comparative example 11.

EXAMPLE 13

The dispersion was prepared similarly to comparative example 11. After the polymerization had ended, 0.5 part by weight of 10% by weight copper sulfate solution was added and the dispersion was intensively stirred. After a further 10 minutes, 0.55 part by weight of 10% by weight ascorbic acid solution was gradually added. The redispersible powder was produced similarly to comparative example 11.

EXAMPLE 14

The dispersion was prepared similarly to comparative example 11. After the polymerization had ended, 0.5 part by weight of 10% by weight zinc sulfate solution was added and the dispersion was intensively stirred. The redispersible powder was produced similarly to comparative example 11.

EXAMPLE 15

The dispersion was prepared similarly to comparative example 11. After the polymerization had ended, 0.1 part by weight of imidazoline (Unimid Z940, Arizona Chemical B. V.) was added and the dispersion was intensively stirred. The redispersible powder was produced similarly to comparative example 11.

EXAMPLE 16

A 400 liter reactor was charged with 15.0 kg of deionized water, 82.6 kg of a 9.0% aqueous solution of a partially hydrolyzed polyvinyl alcohol having a degree of hydrolysis of 94 mol %, 28.5 kg of vinyl acetate and 28.5 g of crotonaldehyde, and the initial charge was heated up with stirring. At 57° C., the initiator additions were begun at a feed rate of 1 kg/h.

Initiator 1: 5.1 kg of deionized water and 273.3 g of 40% tert-butyl hydroperoxide solution Initiator 2: 5.3 kg of deionized water, 177.6 g of sodium bicarbonate and 177.6 g of sodium formaldehydesulfoxylate On completion of the polymerization of the initial charge, the initiator rates were reduced to 0.5 kg/h and monomer mixtures 1 and 2 started.

Monomer Mixture 1:
189.8 g of divinyl adipate, 19.4 kg of VeoVa 10 (vinyl ester of a-branched monocarboxylic acids having 10 carbon atoms) and 66.0 kg of vinyl acetate.

Monomer Mixture 2:
11.4 kg of deionized water, 1.8 kg of a 25% aqueous solution of a nonylphenol ethoxylate having 23 EO units and 9.5 kg of N-methylolacrylamide.

Monomer mixtures 1 and 2 were metered in over 90 minutes. On completion of the addition, the initiator additions were reduced to 300 g/h and the internal temperature was raised to 63° C. During the main reaction, the internal temperature should not exceed 72° C. After the reaction had ended, the initiator additions were adjusted back up to 1 kg/h and addition of the two initiators were each continued for one more hour.

The solids content was 49.8% and the viscosity 40,000 mPas.

For atomization, the dispersion was diluted with water to a solids content of 25% and admixed with respectively 1% by weight, 3% by weight, 5% by weight and 10% by weight of an aluminum sulfate/zinc sulfate mixture (weight ratio 1:3). Spray drying gave a free-flowing powder having a particle size of about 30 μm (volume average).

Odor testing: Evaluation of odor of dispersion films and films formed by redispersible powders on redispersion.

To produce films, the redispersible powders were redispersed in water to form a 30% by weight dispersion.

The dispersions were cast onto a silicone rubber plate and subsequently dried at 23° C. for 24 hours to form films. The films thus obtained in a format of 15 cm×10 cm were introduced into a preheated twist lid 250 ml wide-neck glass flask at 75° C. and placed in a hot drying cabinet at 75° C. for 5 minutes. The films of the emulsifier-stabilized dispersions (Examples 6 to 15) were very brittle. They were therefore transferred in fragments into the wide-neck flasks.

This was followed by cooling to room temperature and odor evaluation by four judges on an odor intensity scale from 1 to 6, where:

1=imperceptible odor, 2=odor perceptible, but not irritating, 3=odor distinctly perceptible, but still not irritating, 4=irritating odor, 5=very irritating odor and 6=unbearable odor.

The results of the odor test are reported in Tables 1 to 3 (D=dispersion; P=powder).

TABLE 1

Results of odor testing

| Example | comp 1 (D) | comp 1 (P) | 2 (D) | 3 (D) | 3 (P) | 4 (D) | 5 (D) |
|---|---|---|---|---|---|---|---|
| Judge 1 | 4 | 4 | 3 | 2 | 2 | 2 | 1 |
| Judge 2 | 4 | 5 | 3 | 1 | 1 | 3 | 2 |
| Judge 3 | 5 | 5 | 3 | 2 | 2 | 3 | 1 |
| Judge 4 | 6 | 5 | 4 | 1 | 2 | 2 | 2 |

TABLE 2

Results of odor testing

| Example | comp 6 (D) | comp 6 (P) | 7 (D) | 8 (D) | 8 (P) | 9 (D) | 10 (D) |
|---|---|---|---|---|---|---|---|
| Judge 1 | 4 | 6 | 3 | 1 | 1 | 2 | 1 |
| Judge 2 | 6 | 5 | 3 | 1 | 1 | 3 | 2 |

TABLE 2-continued

Results of odor testing

| Example | comp 6 (D) | comp 6 (P) | 7 (D) | 8 (D) | 8 (P) | 9 (D) | 10 (D) |
|---|---|---|---|---|---|---|---|
| Judge 3 | 5 | 5 | 2 | 2 | 1 | 3 | 1 |
| Judge 4 | 5 | 6 | 3 | 2 | 2 | 2 | 2 |

TABLE 3

Results of odor testing

| Example | comp 11 (D) | comp 11 (P) | 12 (D) | 13 (D) | 13 (P) | 14 (D) | 15 (D) |
|---|---|---|---|---|---|---|---|
| Judge 1 | 5 | 5 | 3 | 1 | 2 | 2 | 1 |
| Judge 2 | 4 | 5 | 4 | 1 | 1 | 3 | 1 |
| Judge 3 | 5 | 6 | 3 | 2 | 1 | 3 | 2 |
| Judge 4 | 6 | 5 | 4 | 1 | 2 | 2 | 1 |

The test results show that the claimed process achieves effective deodorization not only of polymer dispersions but also of polymer powders.

Production of Fibrous Moldings for Odor Testing:

To produce compression-molded panels, 115 g of reclaimed cotton were mixed with 13.2 g of binder powder of Example 16 and spread out over an area of 24 cm×24 cm. The fiber-powder mixtures were immediately thereafter compression molded at temperatures of about 180° C. for 5 min to produce rigid panels 2 mm in thickness or flexible panels 10 mm in thickness, each having a basis weight of about 2200 g/m$^2$ and a density of about 1115 kg/m$^3$ or 223 kg/m$^3$ respectively.

Odor Testing of Fibrous Moldings:

Specimens having a volume of 50 cm$^3$ were cut out of each of the fibrous moldings and transferred into a 1 l test vessel. The test specimens were subsequently aged at 23° C. for 24 hours (C1), at 40° C. for 24 hours (C2) or at 80° C. for 2 hours (C3).

This was followed by cooling to room temperature and odor evaluation by four judges with reference to the above-described scale from 1 to 6 (reported values are averages):

TABLE 4

Results of odor testing

| | | 2 mm panels | | | 10 mm panels | | |
|---|---|---|---|---|---|---|---|
| Example | Addition | C1 | C2 | C3 | C1 | C2 | C3 |
| 16 | +0% Al/Zn sulfate | 3.5 | 4.5 | 3.0 | 4.0 | 4.0 | 4.0 |
| 16 | +1% Al/Zn sulfate | 3.0 | 4.0 | 4.0 | 3.0 | 3.5 | 4.0 |
| 16 | +3% Al/Zn sulfate | 2.5 | 4.0 | 3.0 | 2.0 | 3.5 | 3.5 |
| 16 | +5% Al/Zn sulfate | 2.0 | 4.0 | 2.0 | 2.0 | 3.0 | 3.0 |
| 16 | +10% Al/Zn sulfate | 3.0 | 4.0 | 3.0 | 2.0 | 4.0 | 3.0 |

The results show that the present process provides products which lead to lower odor emission on processing. The additives may be the sole odor-reducing additives, or may be used in conjunction with other odor-reducing additives.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for reducing odor emission in aqueous polymer dispersions and in polymer powders prepared therefrom, which comprises admixing an aqueous dispersion of a polymer obtained by free-radical polymerization of one or more ethylenically unsaturated monomers, after conclusion of the polymerization, with an odor-reducing composition comprising
   a) one or more water-soluble compounds selected from the group consisting of metal salts of copper(II), metal salts of silver, metal salts of aluminum, metal salts of zinc, iron(III) metal salts, potassium permanganate, and imidazolines,
   optionally in combination with
   b) one or more water-soluble reducing agents selected from the group consisting of ascorbic acid, isoascorbic acid, iron(II) salts, zinc formaldehydesulfoxylate and alkali metal formaldehydesulfoxylate,
   and optionally drying the thus treated aqueous polymer dispersion to form a polymer powder, water-soluble denoting a solubility of $\geq 1$ g/l in water under standard conditions.

2. The process of claim 1, wherein there are admixed
   a) one or more compounds selected from the group consisting of copper(II) sulfate, silver sulfate, aluminum sulfate, zinc sulfate, iron(III) chloride, potassium permanganate, and imidazoline,
   optionally in combination with
   b) a reducing agent selected from the group consisting of ascorbic acid and isoascorbic acid.

3. The process of claim 1, wherein there are admixed as component a) copper(II) sulfate, zinc sulfate, or a mixture of zinc sulfate and aluminum sulfate, each optionally in combination thereof with ascorbic acid as component b).

4. The process of claim 1, wherein the component a) and optionally the component b) are each added in an amount of 0.01% to 15.0% by weight, based on the polymer, to the polymer dispersion.

5. The process of claim 1, wherein the ethylenically unsaturated monomers comprise one or more monomers selected from the group consisting of vinyl esters of branched or unbranched alkylcarboxylic acids having 1 to 18 carbon atoms, acrylic esters or methacrylic esters of branched or unbranched alcohols having 1 to 18 carbon atoms or of diols having 2 to 18 carbon atoms, ethylenically unsaturated mono- and dicarboxylic acids and their amides, N-methylolamides and nitriles, ethylenically unsaturated sulfonic acids, ethylenically unsaturated heterocyclic compounds, dienes, olefins, styrenics and vinyl halides.

6. The process of claim 1, wherein the polymerization is a solution, suspension or emulsion polymerization process.

7. The process of claim 1, wherein the polymer dispersions are dried, and are dried by spray drying.

8. In a construction-chemical product wherein a polymer dispersion or redispersible polymer powder is employed, the improvement comprising employing an odor-reduced polymer dispersion or redispersible polymer powder prepared by the process of claim 1.

9. In a binder for use in coatings and adhesives wherein a polymer dispersion or redispersible polymer powder is employed, the improvement comprising employing an odor-reduced polymer dispersion or redispersible polymer powder prepared by the process of claim 1.

10. In coating or bonding agents for textiles, fibers, wood and paper wherein the coating or bonding agent includes a polymer dispersion or redispersible polymer powder, the improvement comprising employing an odor-reduced polymer dispersion or redispersible polymer powder prepared by the process of claim 1.

* * * * *